US012439850B2

(12) United States Patent
Wenger

(10) Patent No.: US 12,439,850 B2
(45) Date of Patent: Oct. 14, 2025

(54) FLOATING FLOOR ASSEMBLY OF A HEADER

(71) Applicant: CNH Industrial America LLC, New Holland, PA (US)

(72) Inventor: Bradley J. Wenger, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 1012 days.

(21) Appl. No.: 17/441,547

(22) PCT Filed: Mar. 20, 2020

(86) PCT No.: PCT/US2020/023956
§ 371 (c)(1),
(2) Date: Sep. 21, 2021

(87) PCT Pub. No.: WO2020/191332
PCT Pub. Date: Sep. 24, 2020

(65) Prior Publication Data
US 2022/0174872 A1 Jun. 9, 2022

Related U.S. Application Data

(60) Provisional application No. 62/821,725, filed on Mar. 21, 2019.

(51) Int. Cl.
*A01D 41/10* (2006.01)
*A01D 41/14* (2006.01)
(Continued)

(52) U.S. Cl.
CPC ............. *A01D 41/10* (2013.01); *A01D 41/14* (2013.01); *A01D 47/00* (2013.01); *A01D 61/002* (2013.01)

(58) Field of Classification Search
CPC ........ A01D 41/00–41/16; A01D 47/00; A01D 61/002
See application file for complete search history.

(56) References Cited

U.S. PATENT DOCUMENTS 3,096,605 A * 7/1963 Claas ................... A01D 61/008
198/669
4,414,793 A * 11/1983 Halls ...................... A01D 41/14
56/15.8
(Continued)

FOREIGN PATENT DOCUMENTS

EP 3427564 A1 * 1/2019
FR 2294629 A1 7/1976
GB 919870 A 2/1963

OTHER PUBLICATIONS

International Search Report and Written Opinion for PCT App. No. PCT/US2020/023956, mailed Jun. 16, 2020 (13 pages).

*Primary Examiner* — Joseph M Rocca
*Assistant Examiner* — Madeline I Runco
(74) *Attorney, Agent, or Firm* — CM Law; Stephen J. Weed

(57) ABSTRACT

A floor assembly (300) of a header including a floating floor (310) with a stationary lower floor portion (312) and a movable upper floor portion (314). The upper floor portion is configured for contacting a crop material which applies a force onto the upper floor portion. The floor assembly also includes at least one biasing member (320) that is connected to the upper floor portion and configured for biasing the upper floor portion (314) so that the upper floor portion moves in response to the force applied by the crop material.

20 Claims, 3 Drawing Sheets

(51) Int. Cl.
*A01D 47/00* (2006.01)
*A01D 61/00* (2006.01)

(56) References Cited

U.S. PATENT DOCUMENTS

| | | | | |
|---|---|---|---|---|
| 4,599,852 | A * | 7/1986 | Kerber | A01D 41/14 |
| | | | | 56/15.8 |
| 4,722,172 | A * | 2/1988 | Pearce | A01D 57/26 |
| | | | | 56/14.4 |
| 5,005,343 | A * | 4/1991 | Patterson | A01D 57/20 |
| | | | | 56/14.4 |
| 7,975,462 | B1 * | 7/2011 | Figgins | A01D 41/14 |
| | | | | 56/181 |
| 8,555,607 | B2 * | 10/2013 | Coers | A01D 67/00 |
| | | | | 56/181 |
| 8,601,779 | B1 * | 12/2013 | Figgins | A01D 34/283 |
| | | | | 56/181 |
| 9,894,834 | B2 | 2/2018 | van Vooren et al. | |
| 10,791,678 | B2 * | 10/2020 | Hackert | A01F 15/0715 |
| 2002/0129591 | A1 | 9/2002 | Patterson et al. | |
| 2002/0174636 | A1 | 11/2002 | Calmer | |
| 2017/0215342 | A1 * | 8/2017 | Allochis | A01D 57/20 |
| 2019/0104682 | A1 * | 4/2019 | Mossman | A01D 57/20 |

* cited by examiner

FLOATING FLOOR ASSEMBLY OF A HEADER

BACKGROUND OF THE INVENTION

The present invention pertains to headers for agricultural vehicles and, more specifically, to a floor assembly of a header.

An agricultural harvester known as a "combine" is historically termed such because it combines multiple harvesting functions with a single harvesting unit, such as picking, threshing, separating, and cleaning. A combine includes a header which removes the crop from a field and a feeder housing which transports the crop material into a threshing rotor. The threshing rotor rotates within a perforated housing, which may be in the form of adjustable concaves, and performs a threshing operation on the crop to remove the grain. The threshing rotor is provided with rasp bars that interact with the crop material in order to further separate the grain from the crop material, and to provide positive crop movement. Once the grain is threshed, the grain is cleaned using a cleaning system. The cleaning system includes a cleaning fan which blows air through oscillating sieves to discharge chaff and other debris toward the rear of the combine. Non-grain crop material, such as straw, from the threshing section proceeds through a straw chopper and out the rear of the combine. Clean grain is transported to a grain tank onboard the combine.

A typical header generally includes a frame, a pair of end dividers at the lateral ends of the frame, a floor such as a deck, a cutter to remove crop material from the field, and a conveyor to transport the cut crop material to the feeder housing for further downstream processing in the combine. Generally, the components of a header are specifically optimized to harvest a particular kind of crop. For instance, the header may be in the form of a draper header which has a rotating reel with tines, a cutter bar, and a draper belt and/or auger in order to harvest a bushy or fluffy crop, such as soy beans or canola. Alternatively, the header may be in the form of a corn header which includes snouts which define crop receiving gaps therebetween, row units, and an auger to transport the ears of corn into the feeder housing.

Even though the header may be optimized to harvest a specific kind of crop, the auger of the header may nevertheless undesirably convey certain crops toward the feeder housing. For example, with respect to small gain crops with short straw attached thereto, such as short stubble wheat, the distance between the auger fighting and the floor of the header may be too great for the auger to fully engage and convey the crop. Overtime such crop that is not engaged by the auger may buildup in the header, which may then lead to a loss in crop yield. To more desirably convey the crop material, some headers may include floating augers that can move up or down in relation to the floor to engage large or small crop material. However, the issue of crop buildup in the header may nevertheless persist.

What is needed in the art is a cost-effective header that can accommodate numerous kinds of crop.

SUMMARY OF THE INVENTION

In one exemplary embodiment formed in accordance with the present invention, there is provided an agricultural header with a frame, a conveyance auger, and a floating floor assembly with a dynamic floor underneath the auger which adjusts up or down to accommodate large or small crop material. The floating floor assembly includes a two-part floor, composed of a stationary lower floor portion and a movable upper floor portion, and at least one biasing member for biasing the movable upper floor portion toward the auger.

In another exemplary embodiment formed in accordance with the present invention, there is provided a floor assembly of a header for an agricultural vehicle. The floor assembly includes a floating floor with a stationary lower floor portion and a movable upper floor portion connected to the lower floor portion. The upper floor portion is configured for contacting a crop material which applies a force onto the upper floor portion. The floor assembly also includes at least one biasing member that is connected to the upper floor portion and configured for biasing the upper floor portion so that the upper floor portion moves in response to the force applied by the crop material.

In yet another exemplary embodiment formed in accordance with the present invention, there is provided a header for an agricultural vehicle that includes a frame, an auger rotatably connected to the frame, and a floor assembly connected to the frame and positioned underneath the auger. The floor assembly includes a floating floor with a stationary lower floor portion and a movable upper floor portion connected to the lower floor portion. The upper floor portion is configured for contacting a crop material which applies a force onto the upper floor portion. The floor assembly also includes at least one biasing member that is connected to the upper floor portion and configured for biasing the upper floor portion so that the upper floor portion moves in response to the force applied by the crop material.

In yet another exemplary embodiment formed in accordance with the present invention, there is provided a method for varying a crop conveying ability of a header for an agricultural vehicle. The header includes a frame and an auger. The method includes the step of providing a floor assembly. The floor assembly is configured for being connected to the frame and positioned underneath the auger. The floor assembly includes a floating floor with a stationary lower floor portion and a movable upper floor portion connected to the lower floor portion. The upper floor portion is configured for contacting a crop material which applies a force onto the upper floor portion. The floor assembly also includes at least one biasing member connected to the upper floor portion. The method also includes the step of biasing the upper floor portion, by the at least one biasing member, so that the upper floor portion moves in response to the force applied by the crop material. The upper floor portion moves upwardly, closer to the auger, in response to a lighter force applied by the crop material, and the upper floor portion moves downwardly, farther away from the auger, in response to a heavier force applied by the crop material.

One possible advantage of the exemplary embodiment of the floor assembly of the header is that the header may increase crop yield because the header more efficiently conveys large or small grain crops by moving the floor away from or closer to the auger.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting. The terms "downstream" and "upstream" are determined with reference to the intended direction of crop material flow during operation, with "downstream" being analogous to "rearward" and "upstream" being analogous to "forward."

Figure 1:
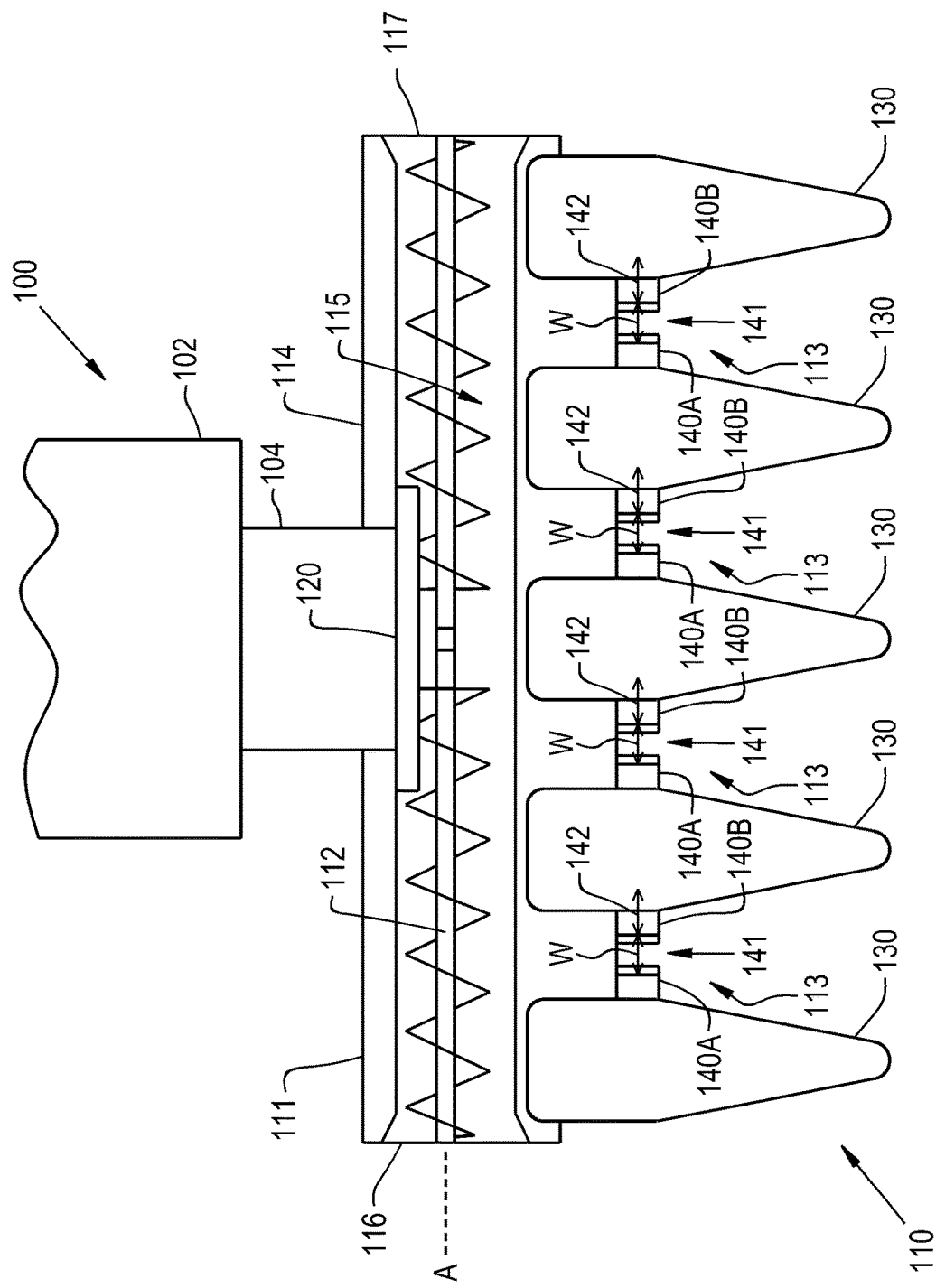
FIG. 1 illustrates a top view of a known agricultural vehicle with a header attached thereto.

Referring now to the drawings, and more particularly to FIG. 1, there is shown an agricultural vehicle 100 that includes a chassis 102, a feeder housing 104 which carries a header 110. The agricultural vehicle 100 may be in the form of any desired agricultural vehicle 100, such as a combine or windrower.

The header 110 generally includes a header frame 111, a conveyor 112, row units 113, and row dividers 130. The header frame 111 can be configured as a substantially rectangular frame including a rear wall 114, a bottom wall 115, and a pair of side walls 116, 117. The header 110 may be in the form of any desired header 110, such as a corn header or draper header. As shown, the header 110 is in the form of a corn header 110.

The conveyor 112 can be connected to the header frame 111 at the side walls 116, 117. The conveyor 112 may rotate about its longitudinal axis A. The conveyor 112 may extend lengthwise across the header frame 111 and convey crop material toward a feeding location 120 and into the feeder housing 104 for further downstream processing within the agricultural vehicle 100. As shown, the conveyor 112 is a screw auger conveyor 112 with left and right fighting. However, the conveyor 112 may be in the form of any desired conveyor, such as an auger, a paddle system, a conveyor belt, or any combination thereof. The conveyor 112 may be a fixed auger such that the conveyor 112 does not float or move up and down. Alternatively, the conveyor 112 may be a floating conveyor which moves up and down relative to the frame 111.

The plurality of row units 113 may be connected to and extend forwardly from the header frame 111. Each row unit 113 may include a pair of gatherers, a pair of snap rollers, a pair of choppers, and/or a pair of deck plates 140A, 140B. The gatherers, snap rollers, and/or the choppers may be driven by gearboxes, which are coupled to one or more cross shaft(s) operably coupled to the PTO of the agricultural vehicle 100. The deck plates 140A, 140B of the row units 113 can be paired together so the deck plates 140A, 140B include a first deck plate 140A and a second deck plate 140B, separated from one another by a distance W. The deck plates 140A, 140B may actuate inwardly and outwardly, indicated by arrow 142.

The row dividers 130 extend forwardly from the header frame 111 and are connected to the plurality of row units 113. The row dividers 130 define a crop receiving gap 141 therebetween for receiving the crop material. The row dividers 130 may be in the form of corn snouts which are pivotally connected to hoods. The row dividers 130 may also include crop saving features and/or attachments, such as ear dams or flaps.

As the agricultural vehicle 100 traverses a field in a forward direction, the standing corn stalks enter the gaps 141 between adjacent row dividers 130. Then, the corn stalks are cut from the field and the ears of corn are stripped from the stalks by the motion of the gatherers and stalk rolls. In more detail, the deck plates 140A, 140B snap off the ears of corn when the ears of corn forcibly contact the deck plates 140A, 140B as the stalk rolls pull the corn stalk downwardly. The ears of corn are then gathered by the conveyor 112 and are transported to the center of the header 110 for entry into the feeder housing 104 and subsequent downstream processing in the agricultural vehicle 100. The stalks and the remaining MOG are pulled down by the stalk rolls and may be chopped into smaller pieces by the chopper.

Figure 2:
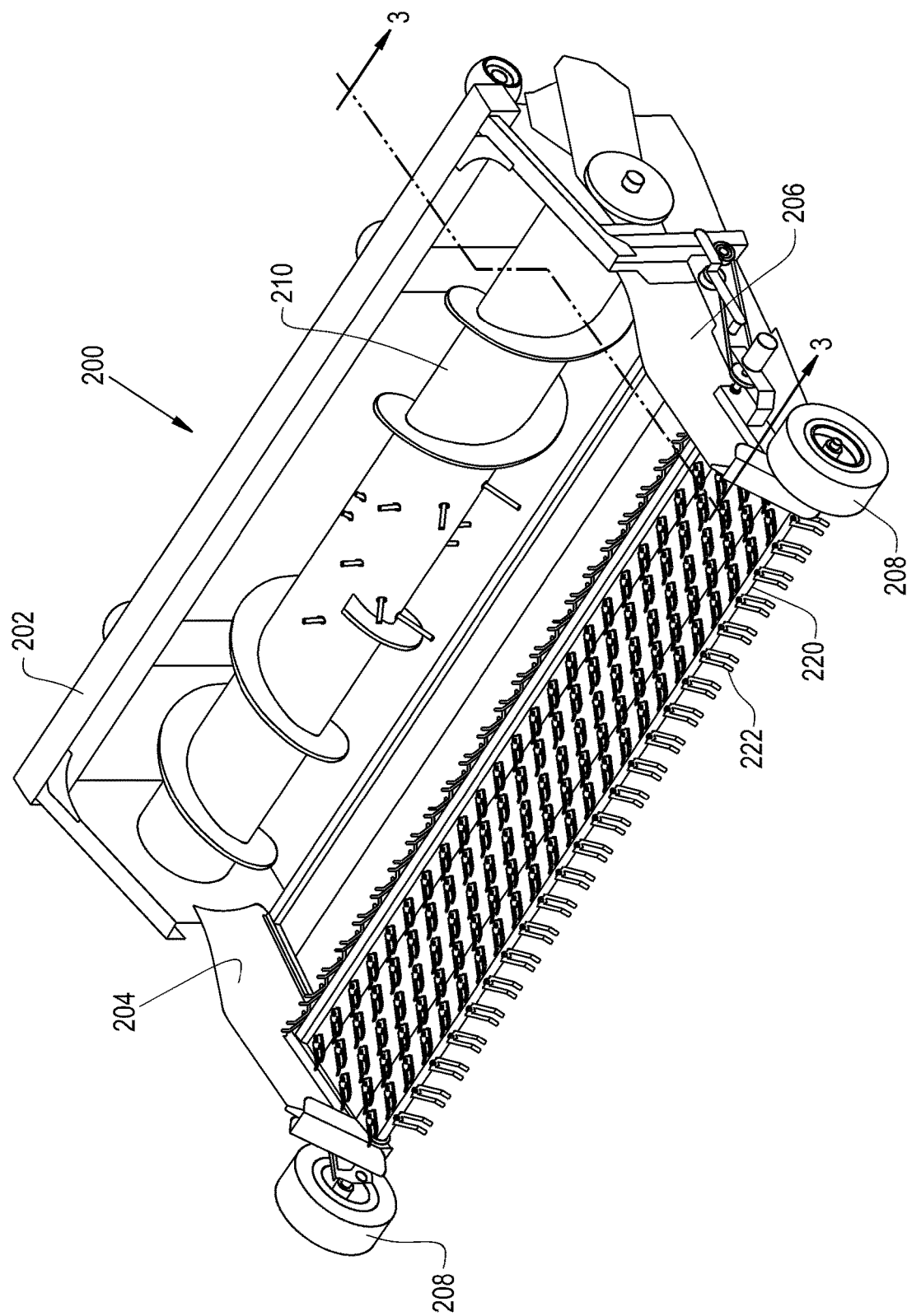
FIG. 2 illustrates a perspective view of an exemplary embodiment of a header, the header comprising a floating floor assembly with a movable floor and a biasing member, in accordance with an exemplary embodiment of the present invention.
Figure 3:
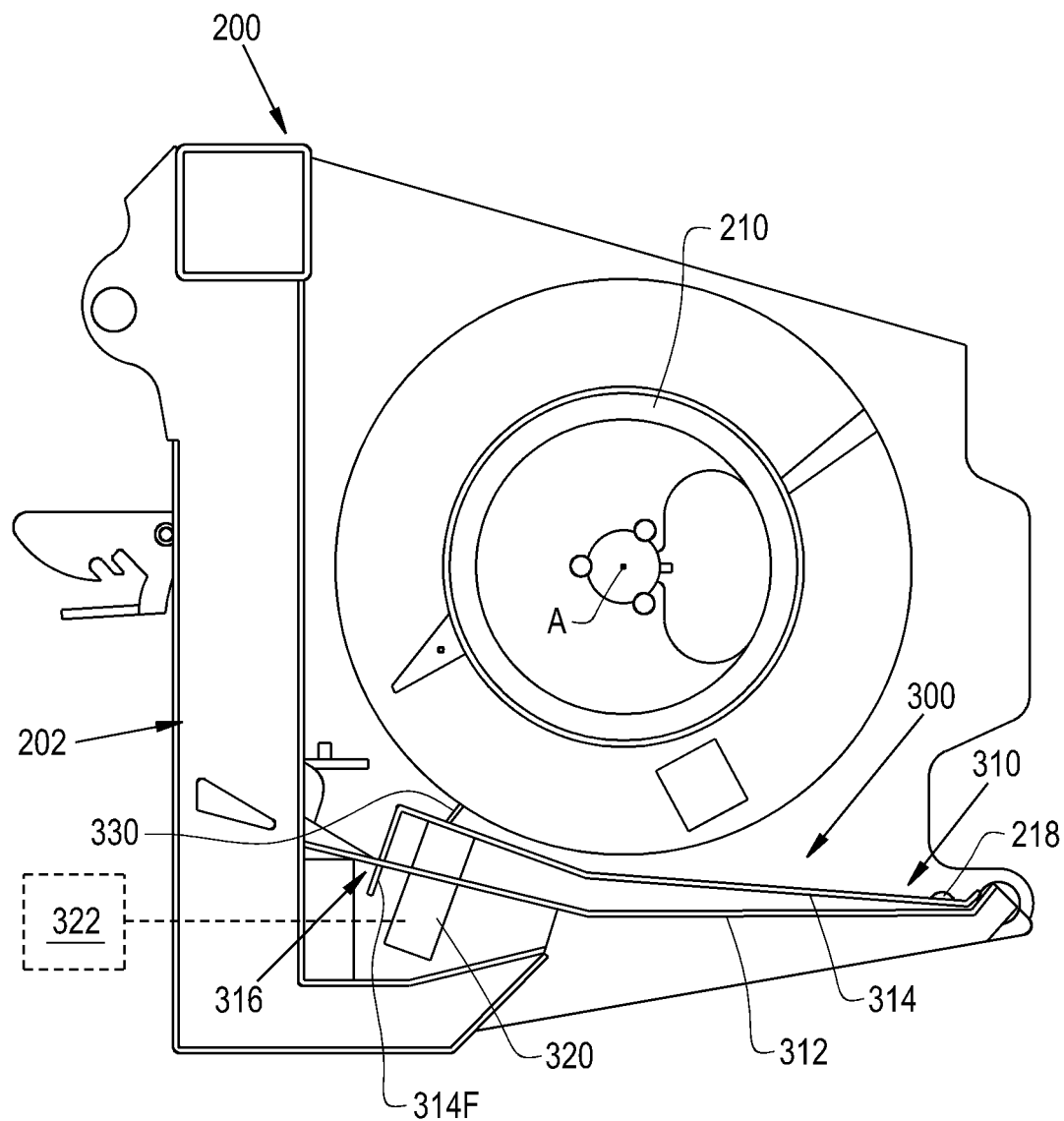
FIG. 3 illustrates a cross-sectional view of the floating floor assembly, taken across line 3-3 of FIG. 2.

Referring now to FIGS. 2-3, there is shown an exemplary embodiment of a header 200. The header 200 may be connected to any desired vehicle, such as the agricultural vehicle 100 described above. The header 200 generally includes a frame 202 with left and right ends 204, 206, wheels 208, a conveyor 210, and a belt 220 which extends in between the left and right ends 204, 206 of the frame 202. Additionally, the header 200 may include a cutter bar as well as an additional conveyor in the form of a belt (not shown).

The conveyor 210 may be in the form of any desired conveyor, such as a rotating auger 210 with left and right fighting (unnumbered). The conveyor 210 may be a fixed auger 210, which does not float or move up and down relative to the frame 202. Alternatively, the conveyor 210 may be a floating conveyor which moves up and down relative to the frame 202.

The belt 220 is rotatably attached to the left and right ends 204, 206 of the frame 202. The belt 220 may include a plurality of tines 222 arranged in an endless loop. The belt 220 may help in collecting a bushy or fluffy crop material or a crop material which is arranged in a windrow. It should be appreciated that the header 200 may not include a belt 220.

Referring now specifically to FIG. 3, the header 200 may additionally include a floor assembly 300 connected to the frame 202 and positioned underneath the auger 210. The floor assembly 300 generally includes a floating floor 310 and at least one biasing member 320. It should be appreciated that the floor assembly 300 may be incorporated with any header, such as a draper header or a corn header. For example, the floor assembly 300 may be incorporated as part of the header 110, as described above.

The floating floor 310 moves up and down relative to the conveyor 210, e.g. auger 112, to engage large or small crop material. For instance, the floating floor 310 may pivot or flex to move lighter crop material, or a lower quantity of crop material, closer to the conveyor 210 and heavier crop material, or a greater quantity of crop material, farther away from the conveyor 210. As used herein, the terms "up" and "down" may refer to any vertical and/or horizontal movement that positions at least a portion of the floating floor 310 closer to and farther away from the conveyor 210, respectively.

The floating floor 310 is connected to the frame 202 and includes a stationary lower floor portion 312 and a movable upper floor portion 314 which contacts the crop material. As crop material enters the header 200, the force, e.g. weight, of the crop material acts on the upper floor portion 314. Hence, the upper floor portion 314 correspondingly moves upwardly, closer to the conveyor 210, in response to a lighter force applied by the crop material, or farther away from the conveyor 210, in response to a heavier force applied by the crop material. The weight of the crop material may apply a force of approximately 4-115 kg/cm (5-100 lbs/in) onto the upper floor portion 314. The floor portions 312, 314 may be a uniform member or comprised of multiple sections. For example, the upper floor portion 314 may be seamless such that the crop material does not become lodged in between the floor portions 312, 314. The floor portions 312, 314 may each comprise any desired material, such as plastic or metal. For example, the upper floor portion 314 may be composed of a flexible material, e.g. spring steel, such that the upper floor portion 314 moves in response to the force of the crop material.

The lower floor portion 312 is fixedly attached to the frame 202 such that its front end is connected to the front of the bottom wall of the frame 202 and its back end is connected to the rear wall of the frame 202. The lower floor portion 312 may include at least one slot 316 which receives the end of the upper floor portion 314. Alternatively, the lower floor portion 312 may not include the slot 316. It is conceivable that the slot 316, or other cutout or opening, may be positioned within the back wall or bottom wall of the frame 202 in order to receive the end of the upper floor portion 314.

The upper floor portion 314 may be fixedly or movably connected to the lower floor portion 312. For example, the front end of the upper floor portion 314 can be fixedly connected to the front end of the lower floor portion 312 and/or bottom wall of the frame 202, via one or more fasteners 218. Alternatively, the front end of the upper floor portion 314 can be movably connected to the front end of the lower floor portion 312 and/or bottom wall of the frame 202 by way of a hinge and/or torsion spring. For instance, a torsion spring may be connected in between the front ends of the lower and upper floor portions 312, 314 (not shown). The rear end of the upper floor portion 314 can be movably connected to the lower floor portion 312 and/or the frame 202. For instance, the back end of the upper floor portion 314 may itself define a closing flange 314F or include a closing flange 314F that is slideably received within the slot 316. Throughout the movement of the upper floor portion 314, the closing flange 314F may rest within the slot 316 so that the crop material is prevented from entering the space in between the floor portions 312, 314.

The at least one biasing member 320 may be connected to the upper floor portion 314 for biasing the upper floor portion 314. The biasing member 320 applies a biasing force onto the upper floor portion 314, which enables the upper floor portion 314 to move in response to the force, e.g. weight, of the crop material, which acts directly onto the upper floor portion 314. In more detail, when the weight of the crop material is less than the biasing force the upper floor portion 314 is pushed upwardly by the biasing member 320, and when the weight of the crop material is greater than the biasing force the upper floor portion 314 is pushed downwardly by the weight of the crop material. It is conceivable that the force of the crop material acting on the upper floor portion 314 may be substantially equal to the biasing force of the biasing member 320 such that the position of the upper floor portion 314 may not change. The at least one biasing member 320 may adjust the upper floor portion 314 so that the distance between the upper floor portion 314 and the conveyor 210 may be approximately 0-13 centimeters (0-5 inches). In the present exemplary embodiment, the floor assembly 300 includes multiple biasing members 220, which are spaced apart, for example by 30-60 centimeters (1-2 feet), across the longitudinal length of the header 200. Each biasing member 320 may be interconnected between the lower floor portion 312 and the upper floor portion 314. For instance, the lower floor portion 312 may include a receiving hole (unnumbered), which receives the biasing member 320. Additionally, the biasing member 320 may be fixedly attached to the lower floor portion 312 by one or more fasteners. However, it should be appreciated that each biasing member 320 may have any desired shape and size such that each biasing member 320 rests entirely within the space between the floor portions 312, 314. Each biasing member 320 may be in the form of a coil spring and/or fluid spring 320, such as a pneumatic spring or a hydraulic spring. As shown, the biasing member 320 is a fluid spring 320. The fluid spring 320 may be operably coupled to a fluid source 322, such as a reservoir or accumulator. The pressure within the fluid spring 320 may be adjusted by raising or lowering the fluid pressure within the fluid source 322. For example, an operator may selectively adjust the fluid pressure within the fluid source 322 from the cab of the agricultural vehicle 100. It should be appreciated that the fluid source 322 may be separately included as part of the floor assembly 300 or integrated within the header 110, 200 and/or agricultural vehicle 100.

The floating floor assembly 300 may additionally include at least one stripper plate 330 that is connected to the topside of the upper floor portion 314. Each stripper plate 330 may force the crop material to engage with the flighting of the conveyor 210 so that the crop material does not buildup or become lodged in the floor assembly 300 or travel past the end of the upper floor portion 314. The stripper plate 330 may be adjustably connected to the upper floor portion 314 such that the stripper plate 330 can be slid forward and rearward and/or moved up and down.

During operation of the header 200, the floating floor assembly 300 automatically performs a method of varying the crop conveying ability of the header 200. In other words, the floating floor assembly 300 automatically adjusts the capacity of the conveyor 210 to push crop material toward the agricultural vehicle 100, e.g. via the feeder housing 104, by biasing the upper floor portion 314 by the biasing member 320. The biasing member 320 automatically applies a biasing force onto the upper floor portion 314 such that the upper floor portion 314 moves upwardly and closer to the conveyor 210, in response to a lighter force applied by the crop material which is less than the biasing force of the biasing member 320. Also, the upper floor portion 314 moves downwardly and farther away from the conveyor 210 when a heavier force applied by the crop material overcomes the biasing force of the biasing member 320. In this regard, the header 200 may automatically and more aggressively convey lighter crop material, such as small grain crops, e.g. short stubble wheat, and less aggressively convey heavier crop material, such as corn, which may not require a shorter distance between the upper floor portion 314 and the conveyor 210.

In another exemplary embodiment, the floating floor assembly 300 may only comprise one floor portion which is fixedly and/or movably connected to the frame 202. For instance, the front and/or back end of the floor portion could be connected via front and/or back actuators to the frame 202. Additionally or alternatively, one or more springs, e.g.

coil springs and/or fluid springs, may be connected in between the floor portion and the frame 202.

In another exemplary embodiment, the floating floor assembly 300 may not include a biasing member 320, or other actuator, which applies a counter force onto the upper floor portion 314. For instance, the upper floor portion 314 may be cantilevered and composed of a flexible material, e.g. spring steel and may not be connected to a biasing member. Hence, the width of the upper floor portion 314 may be accordingly adjusted in order to provide a desired spring force to correspondingly allow the upper floor portion 314 to flex up or down in response to the weight of the crop material.

In another exemplary embodiment, the upper floor portion 314 may be movably connected to the lower floor portion 312 by way of front and/or back actuators, e.g. hydraulic or electric cylinders. In this regard, the front or back actuators may independently move the front or back end of the upper floor portion 314. For example, an actuator may be coupled to the upper floor portion 314 instead of the biasing member 320. Additionally, the actuator(s) may be automatically adjusted by way of an electronic control unit, e.g. controller, which is operably coupled thereto. Furthermore, one or more position and/or pressure sensors may be connected to the controller. The sensor(s) may be integrated with the actuator (s) or connected to the upper floor portion 314. In this regard, the controller may automatically raise or lower the upper floor portion 314 by adjusting the actuators in response to the sensor(s).

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. A floor assembly of a header for an agricultural vehicle, the header comprising a conveyor having a longitudinal axis, comprising:
- a floating floor comprising a stationary lower floor portion and a movable upper floor portion connected to the lower floor portion, and the upper floor portion is configured for contacting a crop material which applies a force onto the upper floor portion, the upper floor portion including a front end and a back end, the front end forward of the back end with reference to direction of forward operative travel of the header; and
- at least one biasing member connected to the upper floor portion rearward of the longitudinal axis of the conveyor with reference to direction of forward operative travel of the header and configured for biasing the upper floor portion at the connection so that the upper floor portion moves in response to the force applied by the crop material,
- wherein of the front end and the back end of the upper floor portion only the back end is connected to both the lower floor portion and the at least one biasing member.

2. The floor assembly of claim 1, wherein the conveyor is an auger and the floating floor is configured for being positioned underneath the auger such that the upper floor portion moves upwardly, closer to the auger, in response to a lighter force applied by the crop material, and the upper floor portion moves downwardly, farther away from the auger, in response to a heavier force applied by the crop material.

3. The floor assembly of claim 1, wherein the front end is fixedly connected to the lower floor portion.

4. The floor assembly of claim 1, wherein the upper floor portion is composed of a flexible material such that the upper floor portion moves one of up and down in response to the force of the crop material.

5. The floor assembly of claim 4, wherein the upper floor portion is comprised of spring steel.

6. The floor assembly of claim 1, wherein the lower floor portion comprises a slot, and the upper floor portion comprises a closing flange, and the closing flange of the upper floor portion is slideably received within the slot of the lower floor portion.

7. The floor assembly of claim 1, wherein the at least one biasing member is interconnected between the lower floor portion and the upper floor portion.

8. The floor assembly of claim 1, wherein the at least one biasing member is in the form of a fluid spring.

9. The floor assembly of claim 1, wherein the upper floor portion of the floating floor is seamless such that the crop material does not become lodged in between the lower floor portion and upper floor portion.

10. A header for an agricultural vehicle, comprising:
- a frame;
- an auger having a longitudinal axis the auger rotatably connected to the frame; and
- a floor assembly connected to the frame and positioned underneath the auger, the floor assembly comprising:
  - a floating floor comprising a stationary lower floor portion and a movable upper floor portion connected to the lower floor portion, and the upper floor portion is configured for contacting a crop material which applies a force onto the upper floor portion, the upper floor portion including a front end and a back end, the front end forward of the back end with reference to direction of forward operative travel of the header; and
  - at least one biasing member connected to the upper floor portion rearward of the longitudinal axis of the auger with reference to direction of forward operative travel of the header and configured for biasing the upper floor portion at the connection so that the upper floor portion moves in response to the force applied by the crop material, of the front end and the back end of the upper floor portion only the back end is connected to both the lower floor portion and the at least one biasing member.

11. The header of claim 10, wherein the upper floor portion moves upwardly, closer to the auger, in response to a lighter force applied by the crop material, and the upper floor portion moves downwardly, farther away from the auger, in response to a heavier force applied by the crop material.

12. The header of claim 10, wherein the front end is fixedly connected to the lower floor portion.

13. The header of claim 10, wherein the upper floor portion is composed of a flexible material such that the upper floor portion moves one of up and down in response to the force of the crop material.

14. The header of claim 13, wherein the upper floor portion is comprised of spring steel.

15. The header of claim 10, wherein the lower floor portion comprises a slot, and the upper floor portion comprises a closing flange, and the closing flange of the upper floor portion is slideably received within the slot of the lower floor portion.

16. The header of claim 10, wherein the at least one biasing member is interconnected between the lower floor portion and the upper floor portion.

17. The header of claim 10, wherein the at least one biasing member is in the form of a fluid spring.

18. The header of claim 10, wherein the upper floor portion of the floating floor is seamless such that the crop material does not become lodged in between the lower floor portion and upper floor portion.

19. The header of claim 10, wherein the auger is a fixed auger that cannot float relative to the frame of the header.

20. A method for varying a crop conveying ability of a header for an agricultural vehicle, the header comprises a frame and an auger having a longitudinal axis, comprising:

providing a floor assembly configured for being connected to the frame and positioned underneath the auger, the floor assembly comprising a floating floor comprising a stationary lower floor portion and a movable upper floor portion connected to the lower floor portion, and the upper floor portion is configured for contacting a crop material which applies a force onto the upper floor portion, the upper floor portion including a front end and a back end, the front end forward of the back end with reference to direction of forward operative travel of the header, and at least one biasing member connected to the upper floor portion rearward of the longitudinal axis of the auger with reference to direction of forward operative travel of the header, of the front end and the back end of the upper floor portion only the back end is connected to both the lower floor portion and the at least one biasing member; and biasing the upper floor portion, by the at least one biasing member at the connection, so that the upper floor portion moves in response to the force applied by the crop material, and the upper floor portion moves upwardly, closer to the auger, in response to a lighter force applied by the crop material, and the upper floor portion moves downwardly, farther away from the auger, in response to a heavier force applied by the crop material.

\* \* \* \* \*